Nov. 10, 1936.   J. H. HAMMOND, JR   2,060,204
TALKING PICTURE WITH DIRECTIONAL EFFECT
Filed Sept. 29, 1934   2 Sheets-Sheet 1
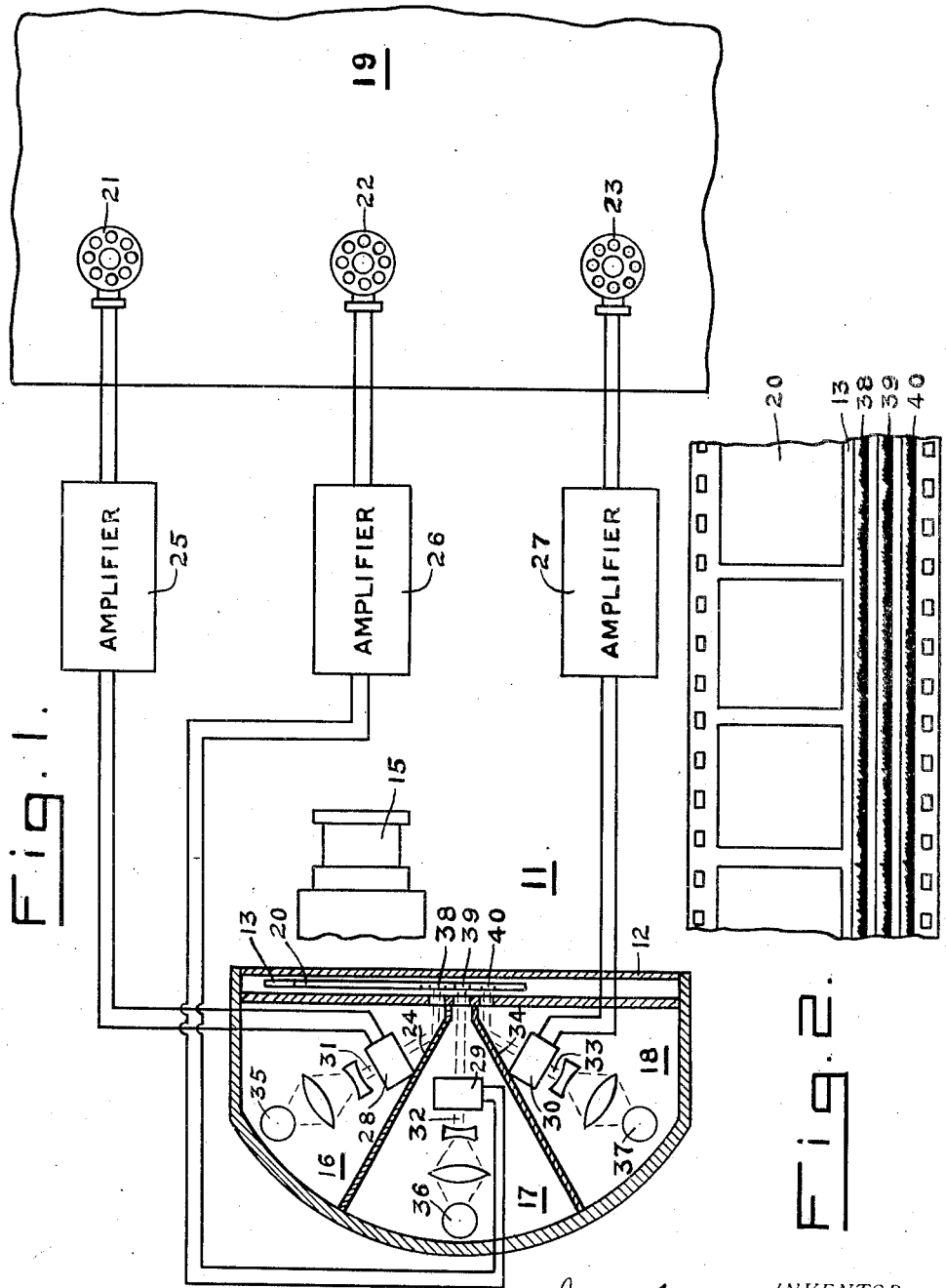

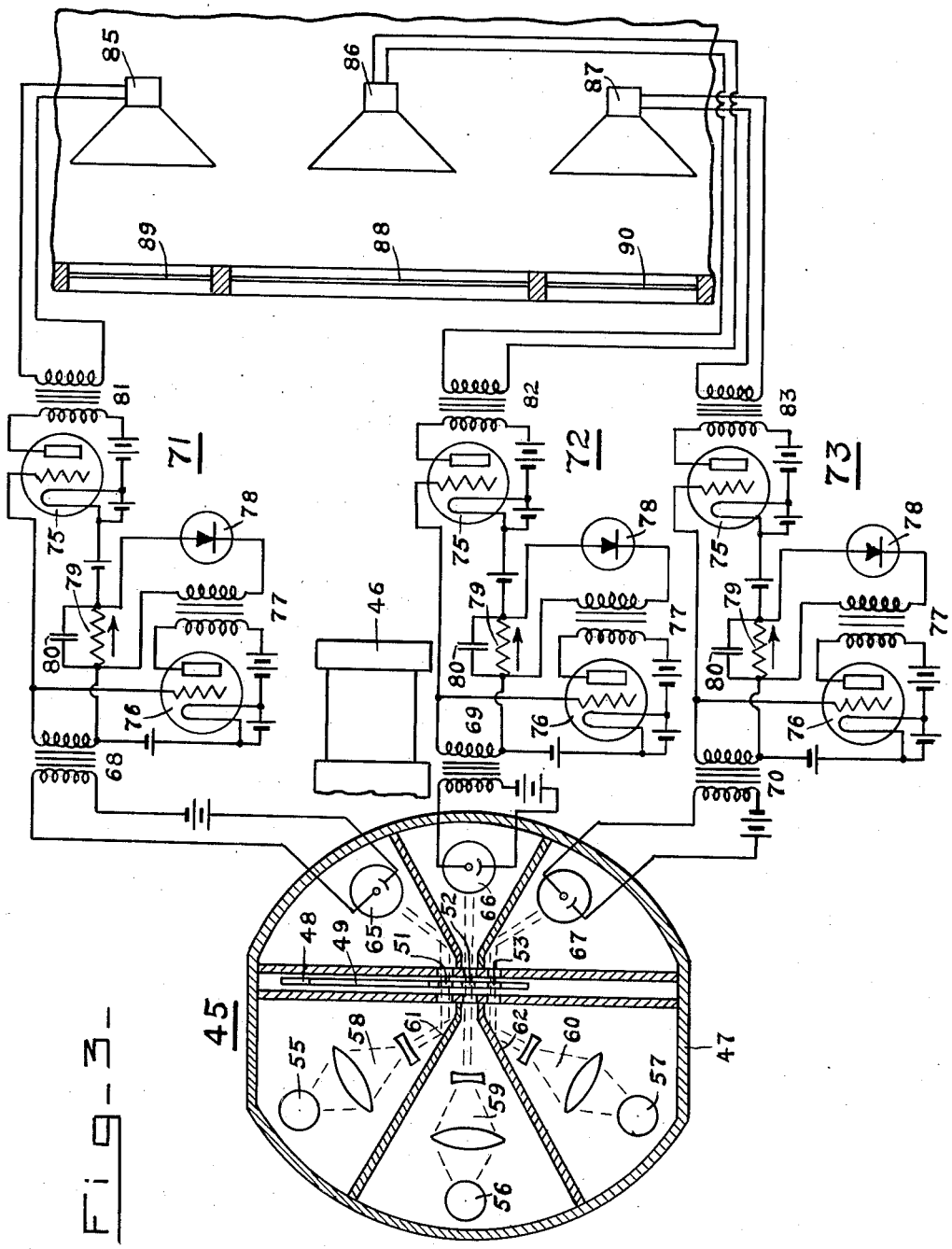

Patented Nov. 10, 1936

2,060,204

UNITED STATES PATENT OFFICE 2,060,204

TALKING PICTURE WITH DIRECTIONAL EFFECT

John Hays Hammond, Jr., Gloucester, Mass.

Application September 29, 1934, Serial No. 746,098

3 Claims. (Cl. 179—100.3)

This invention relates to sound reproducing systems and more particularly to a means for producing stereo-acoustic or auditory perspective effects.

The invention relates more particularly to the field of sound recording and reproducing as practiced in the moving picture industry.

It provides for recording sounds on a sound record, such as a photographic film, and for reproducing the sounds therefrom while causing the reproduced sound to appear to come from that portion of the screen where the source of the sound is shown in the visual picture and to follow the source through any movements it may make on the screen.

According to a preferred embodiment of the invention a photographic film is provided with a plurality of sound tracks, the records on these tracks being made by the sound picked up by a corresponding plurality of microphones located at various positions on the set which is being filmed. When the film is exhibited the records on the plurality of sound tracks are reproduced by a corresponding plurality of loud speakers located behind the screen in the same relative position as the microphones on set.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a diagrammatic view, partly in section, of a moving picture camera with sound recording apparatus and accompanying circuits constructed in accordance with this invention.

Fig. 2 illustrates a photographic film provided with three sound tracks, and

Fig. 3 is a diagrammatic view, partly in section, of a moving picture projector with sound reproducing apparatus and accompanying circuits for use in connection with the film shown in Fig. 2.

Like reference characters denote like parts in the several figures of the drawings.

In the following description and in the claims, parts will be identified by specific names for convenience, but they are intended to be as generic in their application to similar parts as the art will permit.

Referring to the accompanying drawings and more particularly to Fig. 1 a moving picture camera 11 is shown which comprises a casing 12, a moving film 13, a lens 15, and three sound recording mechanisms 16, 17, and 18. The film 13 is fed through the camera in the usual manner and the action taking place on the set 19 is photographed by means of the lens 15 on that portion of the film designated by the numeral 20. Three microphones 21, 22 and 23 are located on the set 19. Each of these is connected through a separate amplifier 25, 26, and 27, respectively, to an individual electrically operated shutter mechanism 28, 29, and 30, respectively, which are located in the paths of travel of three light beams 31, 32 and 33, respectively. These light beams are produced by three sources of illumination 35, 36 and 37 and are focused upon three sound tracks 38, 39, and 40 on the film 13. The light beams 31 and 33 are reflected from mirror surfaces 24 and 34. The shutter mechanisms 28, 29 and 30 are of any standard and well known form such as are at present used for recording sound in the moving picture industry and hence need not be more fully described herein.

As the action taking place on the set 19 is being photographed on the portion 20 of the film 13 the speech or other sounds produced during this action are picked up by the three microphones 21, 22 and 23, amplified by the three amplifiers 25, 26 and 27 and recorded on the tracks 38, 39 and 40 by means of the action of the shutter mechanisms 28, 29 and 30 in a well known and standard manner.

In Fig. 2 is shown a section of the film 13 showing the frames 20 for the pictures and three sound tracks 38, 39 and 40 each of which is a record of the sound picked up by one of the three microphones 21, 22 and 23, respectively.

Referring to Fig. 3 a motion picture projector 45 is shown which is provided with the usual lens system 46. The casing of the projector is shown at 47 and the film at 48. The picture frames on the film are shown at 49 and the three sound tracks at 51, 52 and 53. These sound tracks are positives produced from the three sound tracks 38, 39 and 40, shown on the negative film 13 and have recorded on them the sounds picked up by the three microphones 21, 22 and 23.

Mounted in the casing 47 are three light sources 55, 56 and 57. The light from these sources is focused by means of three lens systems 58, 59 and 60 upon the three sound tracks 51, 52 and 53, the light from the sources 55 and 57 being reflected from the mirror surfaces 61 and 62, respectively.

The three light beams after passing through the sound tracks impinge upon three photo-electric cells 65, 66 and 67.

These cells are connected through three transformers 68, 69 and 70 to three amplifying systems 71, 72 and 73. Each of these amplifying systems comprises an amplifier tube 75 and a control tube 76. The secondary of each of the transformers 68, 69 and 70 is connected in the input circuit of the tubes 75 and 76 of its respective amplifier. The output circuit of the tube 76 is connected in each case through a transformer 77 to a circuit which includes a rectifier 78 and a resistance 79 which is shunted by a condenser 80. The resistance 79 is included in the grid return circuit of the tube 75.

The output circuits of the amplifier tubes 75 are connected through transformers 81, 82 and 83, respectively, to loud speakers 85, 86 and 87, respectively, located on the stage behind the moving picture screen 88 and two gauze curtains 89 and 90 at the sides of the screen. These loud speakers are preferably situated so as to correspond to the relative positions of the microphones 21, 22, 23 on the set 19.

In the operation of the projector shown in Fig. 3 the film 48 is fed through the machine in the usual manner and the picture is projected by the lens system 46 upon the screen 88. The three photo-electric cells 65, 66 and 67 are energized by light from the three sources 55, 56 and 57, which passes through the sound tracks 51, 52 and 53.

The sound frequency energies from the three photo-electric cells then pass through the respective transformers 68, 69 and 70 to the amplifier tube 75. Part of the energies also pass to the respective control tubes 76. The outputs from the control tubes 76 pass through the respective transformers 77 and are rectified by the rectifiers 78. The rectified currents build up potential differences across the resistances 79 which are proportional to the strength of the currents passing through them. In this way the respective biasing potentials on the grids of tubes 75 are varied in accordance with the strength of the input signals so that the gain ratios of the amplifiers 75 will be proportional thereto, being large for strong signals and small for weak ones.

The outputs from the three amplifying systems 71, 72 and 73 pass through the three transformers 81, 82 and 83, respectively, to the respective loud speakers 85, 86 and 87, where the speech or music is reproduced in the usual manner.

The three loud speakers 85, 86 and 87 will, therefore, reproduce the sound recorded on the three sound tracks 51, 52 and 53, respectively, which are records of the sounds picked up by the three microphones 21, 22 and 23 on the set 19. It is evident, therefore, that the three loud speakers 85, 86 and 87 will reproduce the sound effects existing at the three points on the set 19 where the three microphones 21, 22 and 23 were located.

In this way a faithful spatial reproduction of the sound is produced giving a stereo-acoustic or auditory perspective effect. If, for example, a person is standing at the left hand side of the set 19 when it is being filmed the microphone 21 will pick up the most energy, the microphone 22 less and the microphone 23 least. When the sound is reproduced the loud speaker 85 will produce the most sound, the loud speaker 86 less and the loud speaker 87 least, so that the person's voice appears to come from the left hand side of the screen in the same position as the actor is shown on the screen. It is thus seen that the amount of sound produced by each of the loud speakers is dependent upon the location of the source of sound so that the resultant sound, or reproduction, is caused to come from the direction of the location of its source, as shown on the screen, giving a stereo-acoustic effect.

It has been found by experience that if straight amplifiers are used in place of those shown at 71, 72 and 73 that the intensity range of the reproduced sound is not sufficient to produce realistic stereo-acoustic effects. If however, dynamic amplifiers are used as shown in Fig. 3 the intensity range of the sound will be so increased that a faithful stereo-acoustic reproduction will be produced.

It is well known that a sound record, whether it be photographic or mechanical, is limited in the range of sound volume which it is able to record faithfully. This may be due to several causes among which may be included the inherent noise level of the record and the overcutting limit due to the limited width of the sound track. When such records are reproduced with the use of ordinary amplifiers, therefore, the volume range of the reproduced sounds will be considerably less than the range of the original sounds from which the recording was made. This reduction materially decreases the auditory perspective or directional effect in a stereo-acoustic system.

In the example given above, with a speaker standing at the left hand side of set 19, the microphone 21 may receive, for example, twice the energy that microphone 22 receives and four times the energy that microphone 23 receives. On reproduction with an ordinary constant gain ratio amplifier, however, due to the reduction in volume range, loud speaker 85 may produce only one and one-half times the sound volume produced by loud speaker 86 and two times the volume produced by loud speaker 87. The resultant directional effect will accordingly be diminished. The sound will appear to come from a position nearer the center of the screen than the position of the speaker as shown in the visual picture.

By reproduction with variable gain ratio dynamic amplifiers, as in the present invention, however, this defect is eliminated. The loud speaker will reproduce the sounds in the same proportions as picked up. Loud speaker 85, in the example given, will then produce twice the volume produced by speaker 86 and four times that produced by speaker 87. The sound will then appear to come from the exact point on the screen where the actor is shown in the picture.

In some cases it may be desirable to accentuate or even exaggerate the directional effect. For example, where a passing vehicle is to be shown on the screen it may be desired to herald its approach at one side before it arrives in view and to prolong the sounds of its departure after it has passed out of the picture at the other side. By the use of the dynamic amplifiers, as shown, most of the sound may be concentrated in the speaker to the left or to the right of the screen, as desired, so that the apparent direction of the sound is shifted beyond the screen to either side.

Although only a few of the various forms in which this invention may be embodied have been shown herein, it is to be understood that the invention is not limited to any specific construction, but might be embodied in various forms without departing from the spirit of the invention or the scope of the appended claims.

What is claimed is:

1. In a sound recording and reproducing system, a plurality of spaced sound pick-up devices for picking up sound at a plurality of positions having definite spatial relationships to each other, a corresponding plurality of recording devices associated therewith, a plurality of sound tracks for receiving the sound records, a plurality of sound reproducing devices for reproducing the recorded sound from said tracks, said reproducing devices having the same spatial relationship as the pick-up devices used in recording said sound, and means for expanding the dynamic range of the reproduced sound with respect to that of the recorded sound so as to compensate for the compressing effect of the record whereby a true stereo-acoustic effect is produced.

2. In a system for reproducing sound from a plurality of sound records simultaneously recorded from a plurality of spaced microphones, individual pick-up devices fed by said records, individual amplifiers fed by said pick-up devices, means associated with each of said amplifiers for varying the gain ratio of said amplifier responsive to the variations of sound energy picked up by the associated pick-up device so as to compensate for the compressing effect of said records, and individual sound propagating devices fed by said amplifiers, said devices being arranged in similar spatial relationship to the microphones associated with the same sound record.

3. In a system for recording and reproducing sound, a plurality of sound pick-up devices having a definite spatial relationship, sound recording means individual to each of said pick-up devices, sound record tracks individual to each of said recording means, reproducing channels individual to each of said tracks, each of said channels comprising a dynamic amplifier for expanding the volume range of the sound energy transmitted through said channel so as to compensate for the compressing effect of the sound records, and sound propagating devices individual to each of said channels and having the same spatial relationship as the corresponding pick-up devices.

JOHN HAYS HAMMOND, Jr.